United States Patent
Chen et al.

(10) Patent No.: US 6,532,537 B1
(45) Date of Patent: Mar. 11, 2003

(54) METHOD OF REMOTE BOOTING OF A CLIENT COMPUTER IN A LAN

(75) Inventors: Tai-Cheng Chen, Taipei (TW); Zuo-Jun Shih, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/435,998

(22) Filed: Nov. 8, 1999

(30) Foreign Application Priority Data

Mar. 5, 1999 (TW) .......................... 88103346 A

(51) Int. Cl.$^7$ ............................. G06F 9/24; G06F 9/455
(52) U.S. Cl. ................ 713/2; 713/1; 713/100; 711/100
(58) Field of Search ................... 714/6, 35, 48; 713/2, 180, 202, 1, 100; 710/1; 709/217, 222, 229; 711/100

(56) References Cited

U.S. PATENT DOCUMENTS

| | | | | |
|---|---|---|---|---|
| 5,513,346 A | * | 4/1996 | Satagopan et al. | 714/48 |
| 6,003,096 A | * | 12/1999 | Lee | 710/1 |
| 6,209,089 B1 | * | 3/2001 | Selitrennikoff et al. | 713/2 |
| 6,314,455 B1 | * | 11/2001 | Cromer et al. | 709/217 |
| 6,324,644 B1 | * | 11/2001 | Rakavy et al. | 713/1 |
| 6,366,957 B1 | * | 4/2002 | Na | 709/229 |

* cited by examiner

Primary Examiner—Thomas Lee
Assistant Examiner—Thong Thai Tien Nguyen
(74) Attorney, Agent, or Firm—Rabin & Berdo, P.C.

(57) ABSTRACT

A method of remote booting of a client computer in a LAN. The client computer downloads the drivers and the operating systems needed from the server through a coupled PCI network interface card. The driver is provided with a detecting program. When the client computer downloads and executes the first operating system, a hardware interrupt signal is cleared and the booting procedures can be completed successfully.

10 Claims, 5 Drawing Sheets

METHOD OF REMOTE BOOTING OF A CLIENT COMPUTER IN A LAN

BACKGROUND OF THE INVENTION

This application incorporates by reference Taiwanese application Serial No. 88103346, filed May 3, 1999.

1. Field of the Invention

The invention relates in general to a method of remote booting, and more particularly to a method of remote booting by utilizing a network interface card.

2. Description of the Related Art

The conventional network system of the Local Area Network (LAN) includes one server and at least one client computer. In the present network computer systems, considering efficiency, the stability and the safety, the Windows New Technology (NT) Server of Microsoft Corporation can be used for the operating system of the network management. By utilizing the Client-Server structure, it can work efficiently. For example, components can communicate with each other in the network to provide dynamic resource sharing in the Internet or the Intranet.

Owing to the emergence of graphics oriented operating systems, such as Windows, TM, OS/2 etc., there is a bottleneck between the processor and the display peripherals in the standard Input/Output (I/O) of the Personal Computer (PC). Therefore, in order to improve the system efficiency, the designers of the PC utilize the local bus to connect the high bandwidth peripherals to the bus of the processor.

The Industrial Standard Architecture (ISA) bus, a highly efficient 16-bit I/O slot bus for expanding, was presented by IBM in 1984. It made highly efficient PCs become popular. Considering the price and the efficiency, the 32-bit/64-bit Peripheral Component Interconnect (PCI) bus is the most popular and widely accepted by PC users among the various designs of the local bus.

FIG. 1 is a block diagram of the conventional network system. The main server 10 utilizes Windows NT Server as the operating system and includes at least one client computer 12 relating to the main server 10. The client computer 12 includes the network interface card 16 and the memory 18. The client computer 12 couples to the main server 10 through network interface card 16 to load the relative operating system and the driver program. The network interface card 16 includes the boot ROM 14. The network interface card of the prior art includes two types: an ISA network interface card is coupled through the ISA bus and a PCI network interface card is coupled through the PCI bus.

FIG. 2 shows a block diagram of a conventional computer system formed by utilizing the PCI bus. Referring to FIG. 2, the PCI bus 200 connects to the Central Processing Unit (CPU) 204, the cache 206, the Dynamic Random Access Memory (DRAM) 208 through the north bridge 202 and connects to the keyboard/mouse 212 through the south bridge 210. It also connects to the outer network system 220 through the network interface card 218. The north bridge 202 and south bridge 210 are intelligent peripheral controlled chip sets. The north bridge 202 is used to process the peripherals with high speed and efficiency. The south bridge 210 is used to process the low speed peripherals.

FIG. 3 shows a flowchart of the booting steps of the conventional client computer. It shows the booting steps of the client computer coupled to an ISA network interface card. First, in the step S300, the boot Read Only Memory (ROM) 14 of the network interface card 16 is started. Then the main server 10 is logged in by utilizing the boot ROM 14 in the step S302.

In the step S304, the client computer 12 downloads the Network Driver Interface Specification 2 (NDIS2) driver from the main server 10 to the main memory of the system. The system batch executes the NDIS2 driver. The NDIS2 driver is determined by Microsoft for the network interface card driver specification.

When the NDIS2 driver is executed, the client computer 12 downloads the operating system, such as the Disk Operating System (DOS), from the main server 10. After DOS is downloaded to the main memory of the system, the client computer 12 boots itself by DOS in the step S306. In the step S306, DOS is used to manage Windows 95, which is loaded later.

In the step S308, the NDIS2 driver is ended after DOS has completed the booting. In the step S310, the system batch of the client computer 12 executes the NDIS2 driver. Thereafter, the client computer 12 downloads another operating system such as Windows 95 from the main server 10. Then client computer 12 utilizes Windows 95 to complete the booting procedures.

The hardware interrupt signal of the ISA network interface card is edge triggered. Therefore, when the client computer utilizes the ISA network interface card, it generates only one hardware interrupt signal. Then it has no influence on the booting procedures that the hardware interrupt signal is not cleared in the booting procedures, so that the booting procedures can be smoothly performed. In other words, when the client computer utilizes the ISA network interface card, the above-mentioned booting procedures can be completed.

FIG. 4 illustrates the booting procedures of the client computer coupled to the PCI network interface card. Steps S400–S406 are the same as steps S300–S306 and are not discussed again.

The hardware interrupt signal of the PCI network interface card is level triggered. Therefore, when the client computer utilizes a PCI network interface card, the booting procedures can not be completed. In the step S408 of ending the NDIS2 driver, the existence of a hardware interrupt signal which is not cleared according to the conventional method causes the stack of the operating system (DOS, for example) to overflow. Therefore DOS is hanged. In other words, the booting procedures are stopped in the step S410, which makes the PCI network interface card fail to work normally.

However, the speed of the PCI network interface card is faster than that of the ISA network interface card. Therefore, the PCI network interface card becomes a mainstream product, but it can not work properly in the remote booting procedures of the computer in the LAN as mentioned above.

SUMMARY OF THE INVENTION

It is therefore an object of the invention to provide a method of remote booting used in a LAN which has a server and at least one client computer. The client computer has a memory and is coupled to the server through a network interface card. The network interface card has a driver and a interrupt vector table. First the boot ROM of the network interface card is started. Then, the client computer logs in the server and downloads and executes the network interface card's driver which has a detecting program. Next, the detecting program is executed to detect a first interrupt signal and intercept the first interrupt signal when it is detected. Then, a backup of the interrupt vector table of the network interface card is made in the memory. The detecting program is executed again to detect the first interrupt signal. Next, the client computer downloads and executes the first operating system from the server. Then, the driver is ended by utilizing the second interrupt signal. Afterwards, the first operating system calls the first interrupt signal. Next, the second interrupt signal is cleared when the interrupt vector table is different from the backup of the interrupt vector table in the memory. The driver is executed. The client computer downloads and executes the second operating system from the server.

It is therefore another object of the invention to provide a method for supervising in order to clear a first interrupt signal of a PCI network interface card of a client computer in a LAN which comprises a main server and at least one client computer. The client computer is coupled to the main server through a network interface card which is coupled to the PCI bus of the client computer. The method comprising the following steps. The client computer downloads and executes a driver of the network interface card. The driver has a detecting program in it. The client computer executes the detecting program to detect whether the driver is unloaded or not. When the driver is unloaded, the driver clears automatically the first interrupt signal of the network interface card.

Therefore, the problems in the conventional method that the operating system is hanged and the booting procedures can not completed are overcome and the purposes of the invention are achieved.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 5:
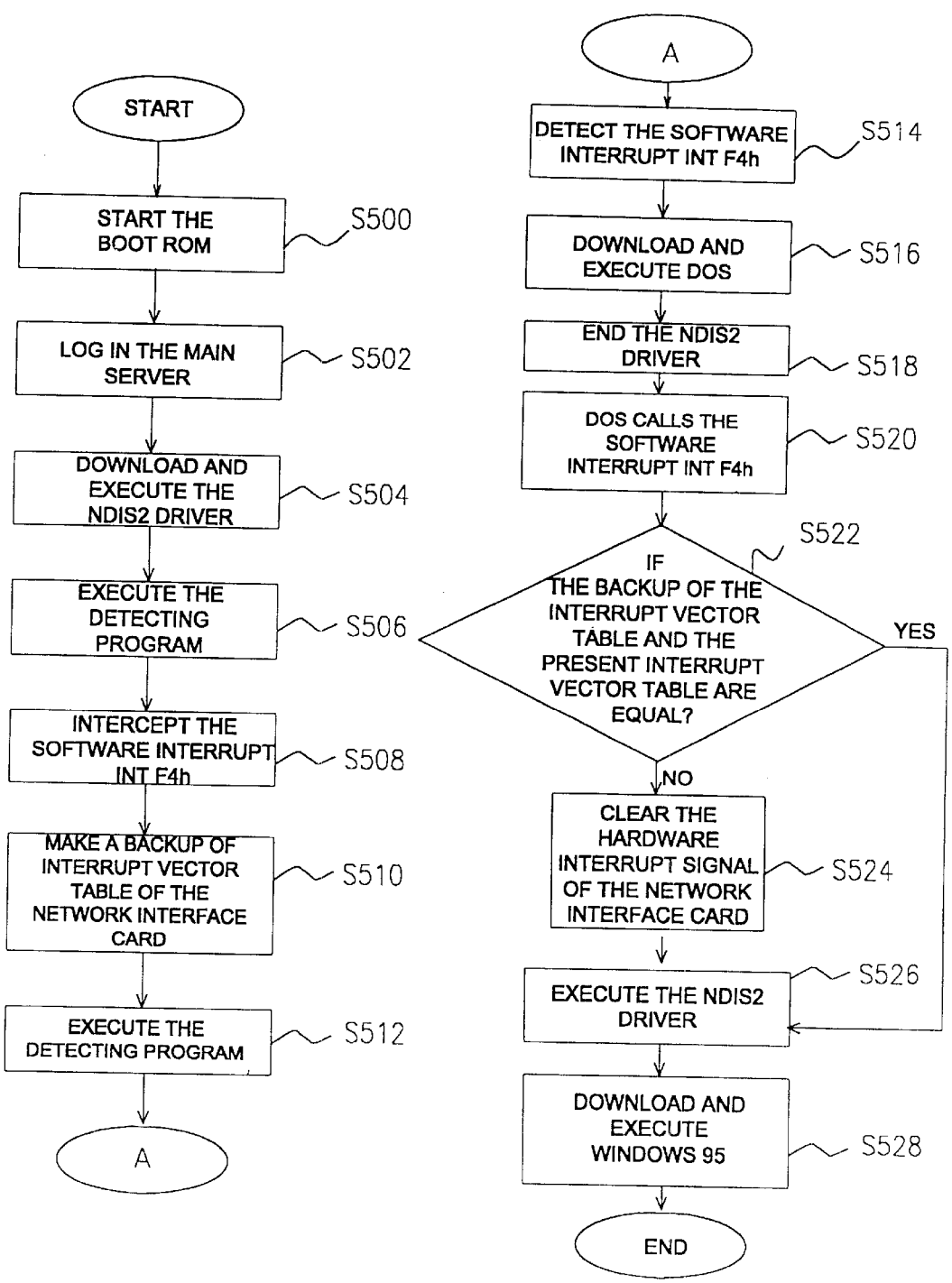
FIG. 5 shows the remote booting procedures according to the invention.

Referring first to FIG. 5, a flowchart of the preferred embodiment of the invention is shown.

As mentioned above, the drawback of the prior art is that after the DOS boots, a client computer utilizing a PCI network interface card can not clear the hardware interrupt signal of the network interface card, which leads DOS to be hanged. Therefore, the booting procedures are stopped.

Consequently, according to a preferred embodiment of the invention a detecting program is added in the NDIS2 driver to detect a software interrupt signal. When the software interrupt signal is detected, the hardware interrupt signal of the PCI network interface card is cleared by the driver. Therefore DOS is presented from being hanged, and enables the booting procedures to be completed.

Figure 1:
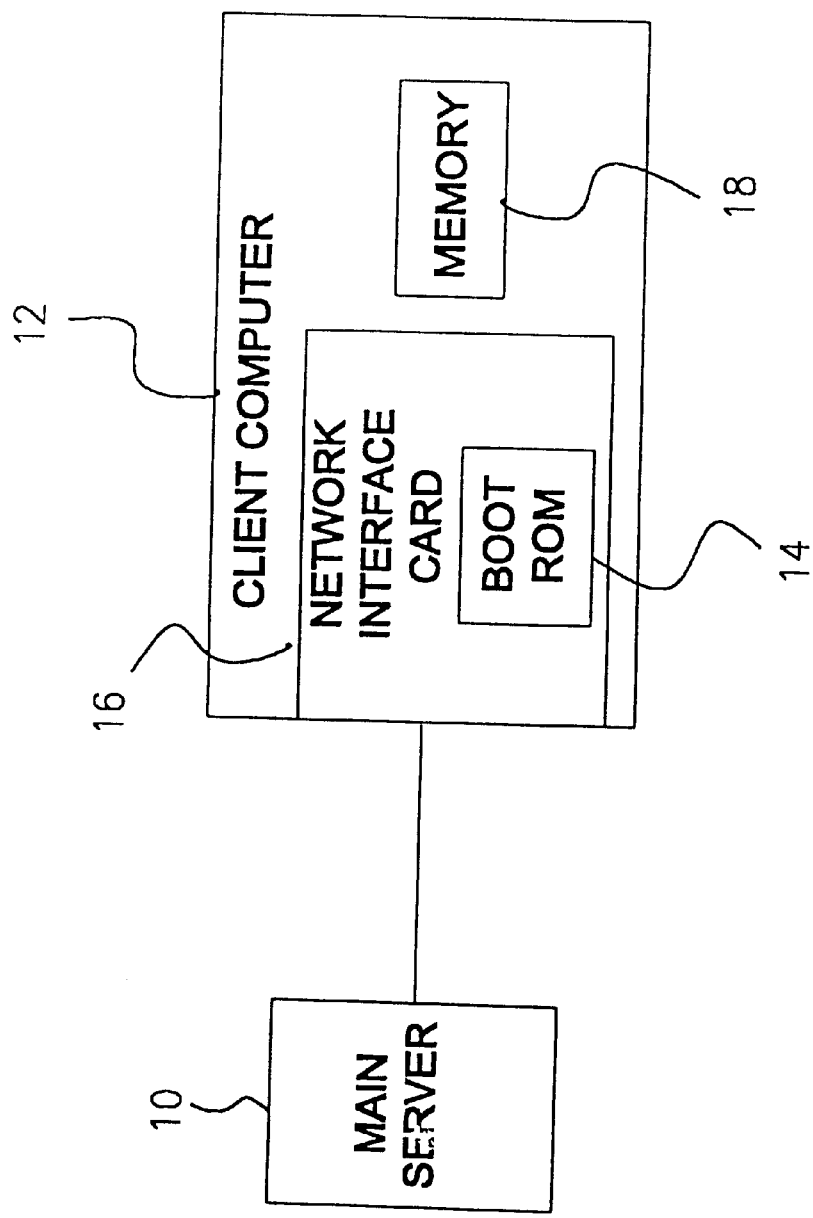
FIG. 1 (Prior Art) illustrates the connections between the sever and the client computer.
Figure 2:
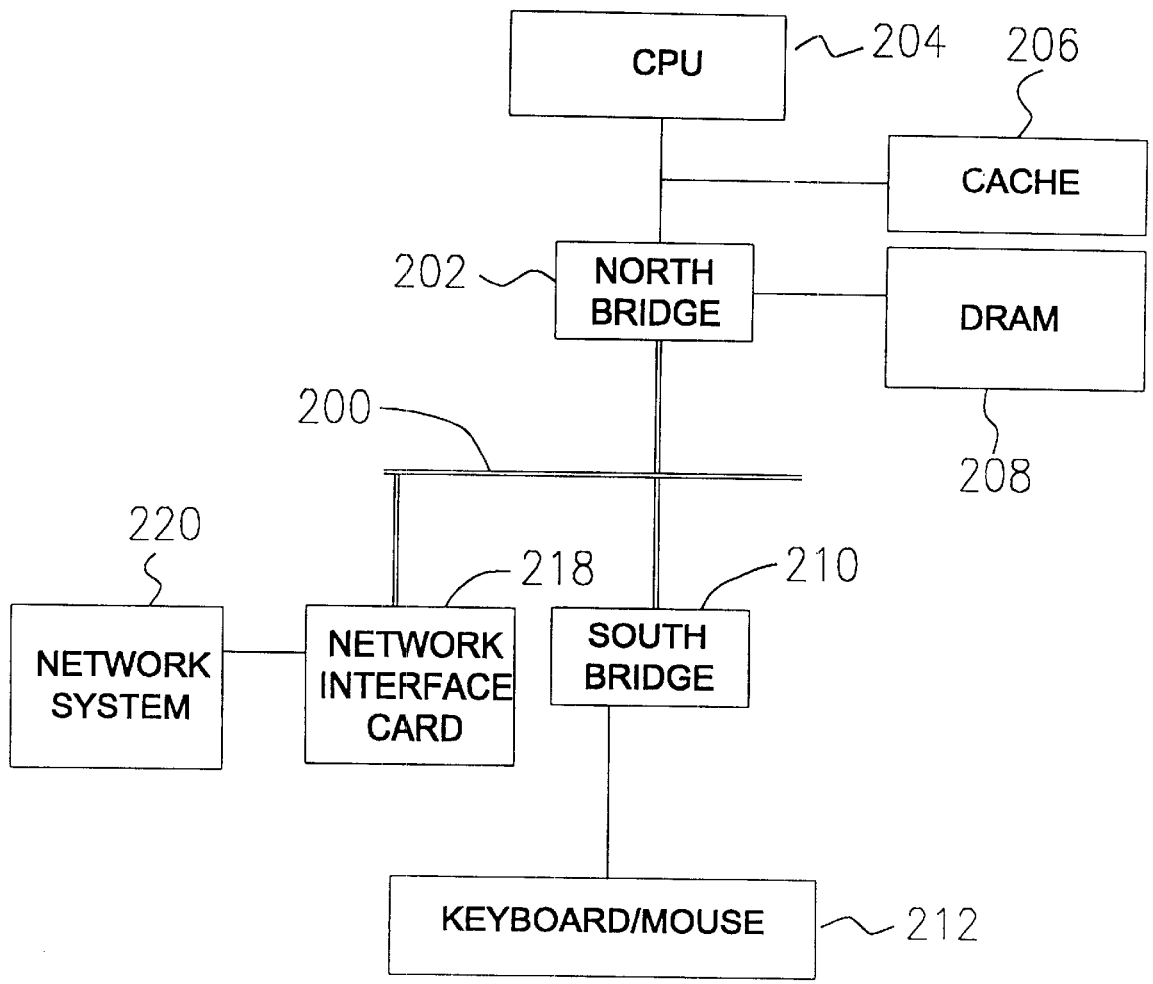
FIG. 2 (Prior Art) shows a block diagram of the conventional computer system utilizing the PCI bus.
Figure 3:
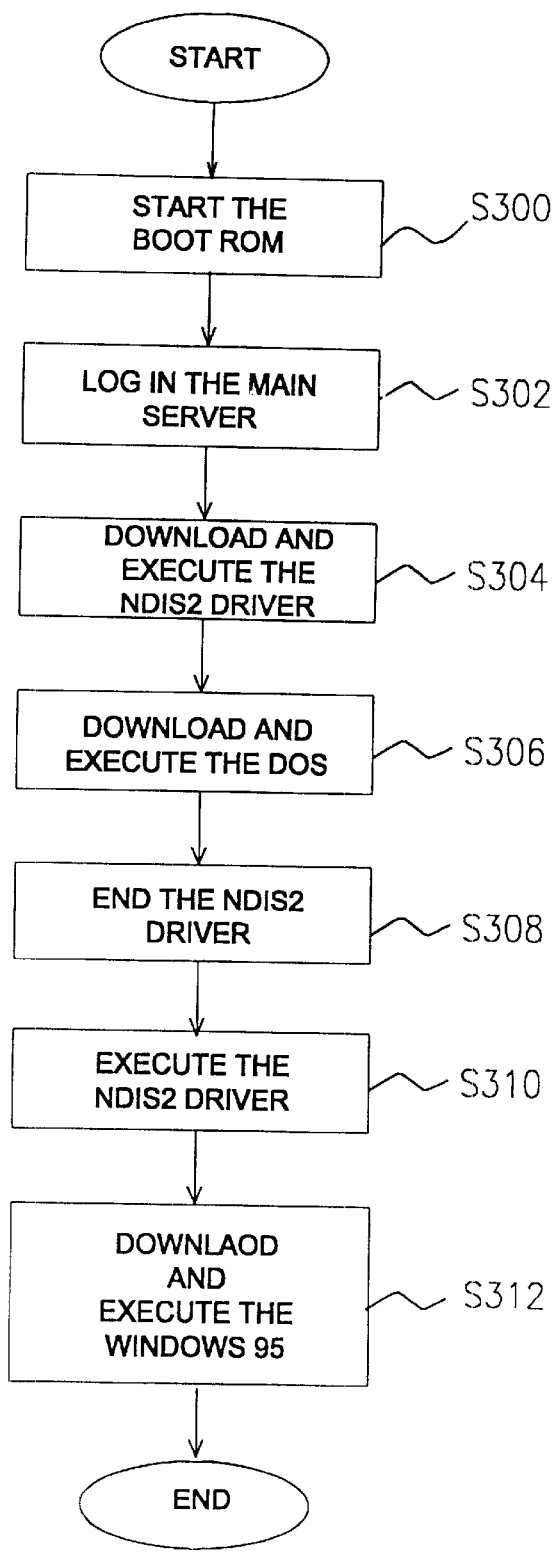
FIG. 3 (Prior Art) shows the successful booting procedures of the client computer coupled to the ISA network interface card in the prior art.
Figure 4:
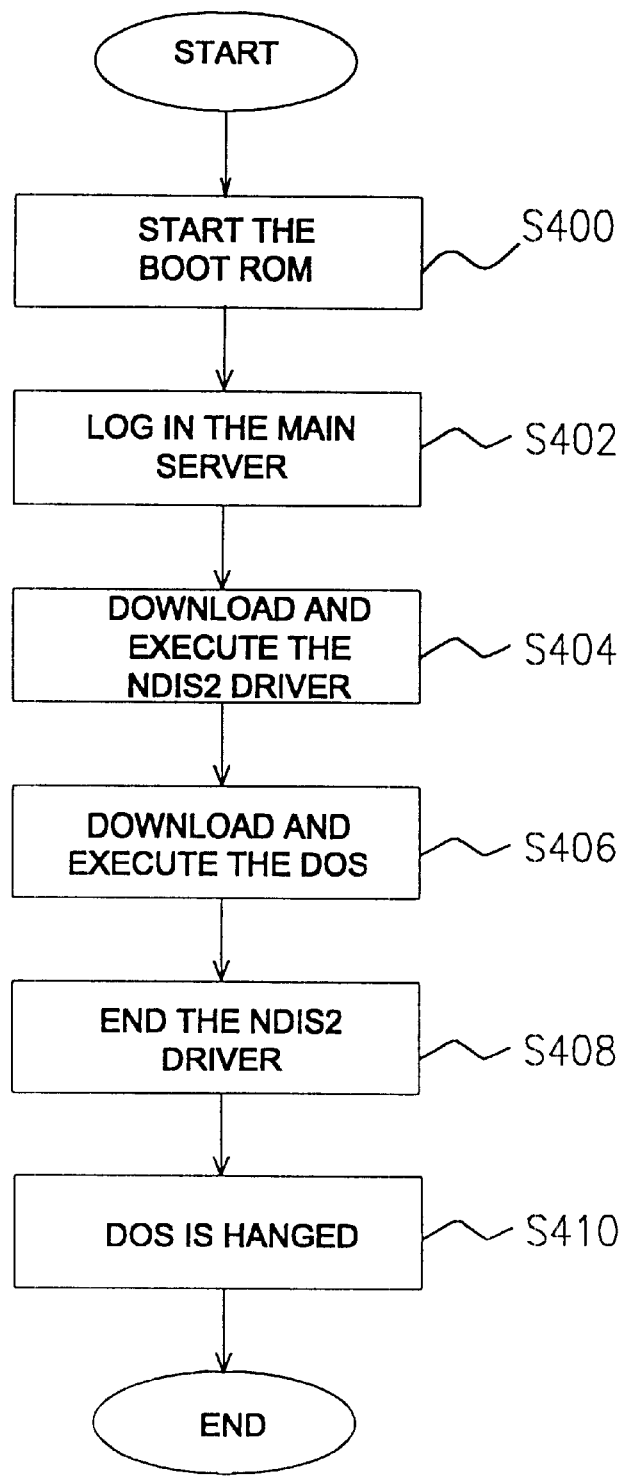
FIG. 4 (Prior Art) shows the failed booting procedures of the client computer coupled to the PCI network interface card in the prior art.

Referring to FIG. 5, the purposes of steps S500–S504 can be achieved by the above-mentioned steps S300–S304 in FIG. 3. Therefore, steps S500–S504 are not discussed here.

In the step S506, because the detecting program is added in the NDIS2 driver, when the NDIS2 driver is started, the detecting program is executed simultaneously.

As illustrated in the step S508, the detecting program starts to intercept the software interrupt INTF4h. The software interrupt INTF4h is used to be the function call when the network software ends.

When the interrupt signal is intercepted by the detecting program, the detecting program makes a backup of the interrupt vector table of the network interface card in the memory in the step S510.

Then, the detecting program is executed again to detect the software interrupt INTF4h as in steps S512 and S514.

In the step S516, the client computer downloads and executes the operating system (DOS, for example) after the NDIS2 driver is executed successfully.

Then, in the step S518, the NDIS2 driver is ended by the hardware interrupt signal of the network interface card.

The backup of the interrupt vector table made in the step S510 is compared with the present interrupt vector table as in the step S522. If they are the same, the step S526 is performed. If they are different, the hardware interrupt signal of the network interface card is cleared as in the step S524. How to clear the hardware interrupt signal of the network interface card is apparent to people skilled in the art. Therefore, it is not further discussed here.

Next, in the step S526, the NDIS2 driver is executed. Afterwards, the client computer downloads and executes another operating system (Windows 95, for example) form the main server as in the step S528.

According to the invention, the problems of the conventional method are overcome. In the invention, the detecting program is added into the driver (NDIS2) of the apparatus (network interface card) and continually detects for a software interrupt signal. If a software interrupt signal is detected, the driver automatically clears the hardware interrupt signal and the problem is solved.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of remote booting, used in a Local Area Network (LAN) comprising a server and a client computer, wherein the client computer comprises a network interface card and a memory that is coupled to the server through the network interface card, and wherein the network interface card has a driver and an interrupt vector table, the method comprising the steps of:

starting a boot Read Only Memory (ROM) of the network interface card;

logging on the server;

downloading and executing the driver of the network interface card, wherein the driver includes a detecting program;

executing the detecting program;

detecting a first interrupt signal by the detecting program and intercepting the first interrupt signal when it is detected;

making a backup of the interrupt vector table of the network interface card in the memory;

executing the detecting program again to detect the first interrupt signal;

downloading and executing a first operating system from the server to the client computer;

utilizing a second interrupt signal to end the driver;

calling the first interrupt signal by the first operating system;

clearing the second interrupt signal if the interrupt vector table is different from the backup of the interrupt vector table in the memory;

executing the driver; and downloading and executing a second operating system from the server to the client computer.

2. A method according to claim 1, wherein the network interface card is coupled to the client computer through a Peripheral Component Interconnect (PCI) bus.

3. A method according to claim 1, wherein the first interrupt signal is a software interrupt INTF4h.

4. A method according to claim 1, wherein the second interrupt signal is a hardware interrupt signal of the network interface card.

5. A method for supervising, used to clear a first interrupt signal of a PCI network interface card of a client computer in a LAN, wherein the LAN comprises a main server in addition to the client computer, wherein the client computer is coupled to the main server through the network interface card, and wherein the client computer has a PCI bus and the network interface card is coupled to the PCI bus of the client computer, the method comprising the steps of:

downloading and executing a driver of the network interface card, wherein the driver includes a detecting program;

executing the detecting program to detect whether the driver is unloaded or not; and clearing automatically a first interrupt signal of the network interface card by the driver when the driver is unloaded.

6. A method according to claim 5, further comprising the following steps:

starting a boot ROM of the network interface card; and logging on the server.

7. A method according to claim 6, wherein the network interface card has a interrupt vector table, and further comprising the following steps:

intercepting a second interrupt signal by the detecting program;

making a backup of the interrupt vector table of the network interface card;

executing the detecting program to detect the second interrupt signal;

downloading and executing a first operating system from the server to the client computer;

ending the driver by the first interrupt signal;

calling the first interrupt signal by the first operating system; and clearing the first interrupt signal if the interrupt vector table is different from the backup of the interrupt vector table.

8. A method according to claim 5, wherein the driver is a Network Driver Interface Specification 2 (NDIS2) driver.

9. A method according to claim 5, wherein the network interface card has a hardware interrupt signal and the first interrupt signal is the hardware interrupt signal of the network interface card.

10. A method according to claim 7, wherein the second interrupt signal is a software interrupt INTF4h.

* * * * *